US012051255B1

(12) United States Patent
Sharma et al.

(10) Patent No.: US 12,051,255 B1
(45) Date of Patent: Jul. 30, 2024

(54) MACHINE LEARNING DOCUMENT CLASSIFICATION

(71) Applicant: States Title, LLC, San Francisco, CA (US)

(72) Inventors: Apoorv Sharma, San Francisco, CA (US); Brian Holligan, San Francisco, CA (US)

(73) Assignee: States Title, LLC, San Francisco, CA (US)

( * ) Notice: Subject to any disclaimer, the term of this patent is extended or adjusted under 35 U.S.C. 154(b) by 504 days.

(21) Appl. No.: 17/315,068

(22) Filed: May 7, 2021

(51) Int. Cl.
*G06V 30/413* (2022.01)
*G06F 18/22* (2023.01)
*G06F 18/241* (2023.01)
*G06F 40/279* (2020.01)
*G06N 20/00* (2019.01)

(52) U.S. Cl.
CPC ............ *G06V 30/413* (2022.01); *G06F 18/22* (2023.01); *G06F 18/241* (2023.01); *G06F 40/279* (2020.01); *G06N 20/00* (2019.01)

(58) Field of Classification Search
CPC ..... G06V 30/413; G06F 18/22; G06F 18/241; G06F 40/279; G06N 20/00
See application file for complete search history.

(56) References Cited

U.S. PATENT DOCUMENTS

| | | | | |
|---|---|---|---|---|
| 5,832,208 A | * | 11/1998 | Chen | ...................... G06F 21/566 713/188 |
| 6,424,997 B1 | * | 7/2002 | Buskirk, Jr. | ......... G06Q 10/107 709/201 |
| 2016/0336006 A1 | * | 11/2016 | Levit | ....................... G10L 15/18 |

* cited by examiner

*Primary Examiner* — Siamak Harandi
(74) *Attorney, Agent, or Firm* — Fish & Richardson P.C.

(57) ABSTRACT

Methods, systems, and apparatus, including computer programs encoded on computer storage media, for machine learning. One of the methods includes receiving a message including an attachment document; determining one or more first features from content of the attachment document; providing the first features to one or more classification models, the one or more classification models including a machine learning model, wherein the machine learning model is trained to generate a prediction of one or more classifications of attachment documents based on input features; generating one or more predicted classifications of the attachment document; and associating the one or more predicted classifications with the attachment document.

21 Claims, 4 Drawing Sheets

MACHINE LEARNING DOCUMENT CLASSIFICATION

BACKGROUND

This specification relates to machine learning. Conventional machine learning models can be trained to generate a particular type of output from a given input. Typically, a machine learning model is trained using a collection of labeled training data. The machine learning model can be trained such that the model correctly labels the input training data. New data can then be input into the machine learning model to determine a corresponding label for the new data.

SUMMARY

Machine learning models can be used to identify data having a particular type. This specification describes a system that uses a machine learning model to process input documents and corresponding attachments and to generate a prediction of one or more classifications for each attachment. In particular, the machine learning model can be trained based on a collection of training examples of messages, e.g., e-mails, and associated attachments. For a given input message, features can be determined based on processing of both the attachment and, in some cases, the content of the message. In some implementations, attachment text is standardized, for example, using a domain knowledge base or one or more named entity recognition models, before extracting features. The features are provided as input to the trained machine learning model. In some implementations, the output is a single document classification. In some other implementations, the output is a ranked set of possible classifications.

In general, one innovative aspect of the subject matter described in this specification can be embodied in methods that include the actions of receiving a message including an attachment document; determining one or more first features from content of the attachment document; providing the first features to one or more classification models, the one or more classification models including a machine learning model, wherein the machine learning model is trained to generate a prediction of one or more classifications of attachment documents based on input features; generating one or more predicted classifications of the attachment document; and associating the one or more predicted classifications with the attachment document.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Determining one or more first features from content of the attachment document includes: standardizing text content of the attachment document; and generating the one or more first features from vectors computed from n-grams of the standardized text content. Determining one or more first features further includes performing text recognition on the attachment document, wherein the text recognition is associated with one or more confidence values. The one or more classification models includes a rule based model, wherein the rule based model applies one or more rules to the input features, and wherein the rule-based model is applied to the input features based on the one or more confidence values. In response to determining that a classification output by the machine learning model is different from a classification output by the rule-based model, the classification of the rule-based model is set as the predicted classification of the attachment document. The method further includes determining one or more second features from content of the message, wherein determining one or more second features from content of the message includes: generating one or more features based on text of the message matching predefined words or phrases, wherein the matching satisfies a specified degree of match between the text of the message and the predefined words or phrases. Determining one or more second features from the content or the message includes: determining the presence of a unique identifier in the content of the message corresponding to a unique file record; and generating one or more features based on the content of the file record.

The subject matter described in this specification can be implemented in particular embodiments so as to realize one or more of the following advantages. Using machine learning models, eliminates the need for manual interpretation of document types, which reduces the time needed to evaluate incoming messages. Additionally, based on a determined classification of a given attachment, the message can be routed to an appropriate recipient for processing the document. In particular, received email messages containing attachments can be processed more quickly. Moreover, it can facilitate the automatic processing and responses to email messages. In some cases, based on the processing output, one or more downstream workflows can be triggered and the attachments may be automatically routed as appropriate for those workflows.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This specification describes techniques for training and applying a machine learning model. The machine learning model can be trained to predict the likelihood that a document has a particular classification. The machine learning model can be trained using a collection of labeled training data. In some implementations, the classification is performed on documents that are attachments to messages (e.g., e-mail messages or other electronic messages). Features input to the model can include features derived both from the attachment and from the message itself. The output of the machine learning model can include a single classification result or a ranked set of possible classifications.

In some implementations, various processing operations are performed on one or both an input message and its corresponding attachments to determine or derive features for inputting into the model. These processing operations are described in greater detail below and include extracting identifying information from the message, analyzing the message content for particular words or phrases, and extracting features from the attachment document. In some implementations, based on the outcome of these processing operations, the system can provide the features to both a machine learning model and a rule-based model to determine a classification of the attachment document.

In some implementations, the described machine learning models are part of a title production system for real property transactions. A title production system is used by title companies to manage workflows and work with various third parties involved in the transaction. During a typical real property transaction, there are a number of actions that need to take place, for example, to generate a title insurance policy for the real property transaction. To facilitate these actions information is often passed back and forth between the title company and other parties, e.g., lenders. In particular, various forms are often attached to email messages. Conventionally, a human viewer opens each email message, determines what the message relates to, and then either forwards the attachment to the correct person or opens and manually inputs information into the title production system. However, being able to automatically classify the attachments, for example, as particular forms, can add efficiency to the title production workflows including triggering particular phases of a corresponding workflow based on receipt of particular documents. For example, based on a classification of an attachment, the system can determine that a next step is to extract particular strings from the attachment document and route the attachment accordingly.

Figure 1:
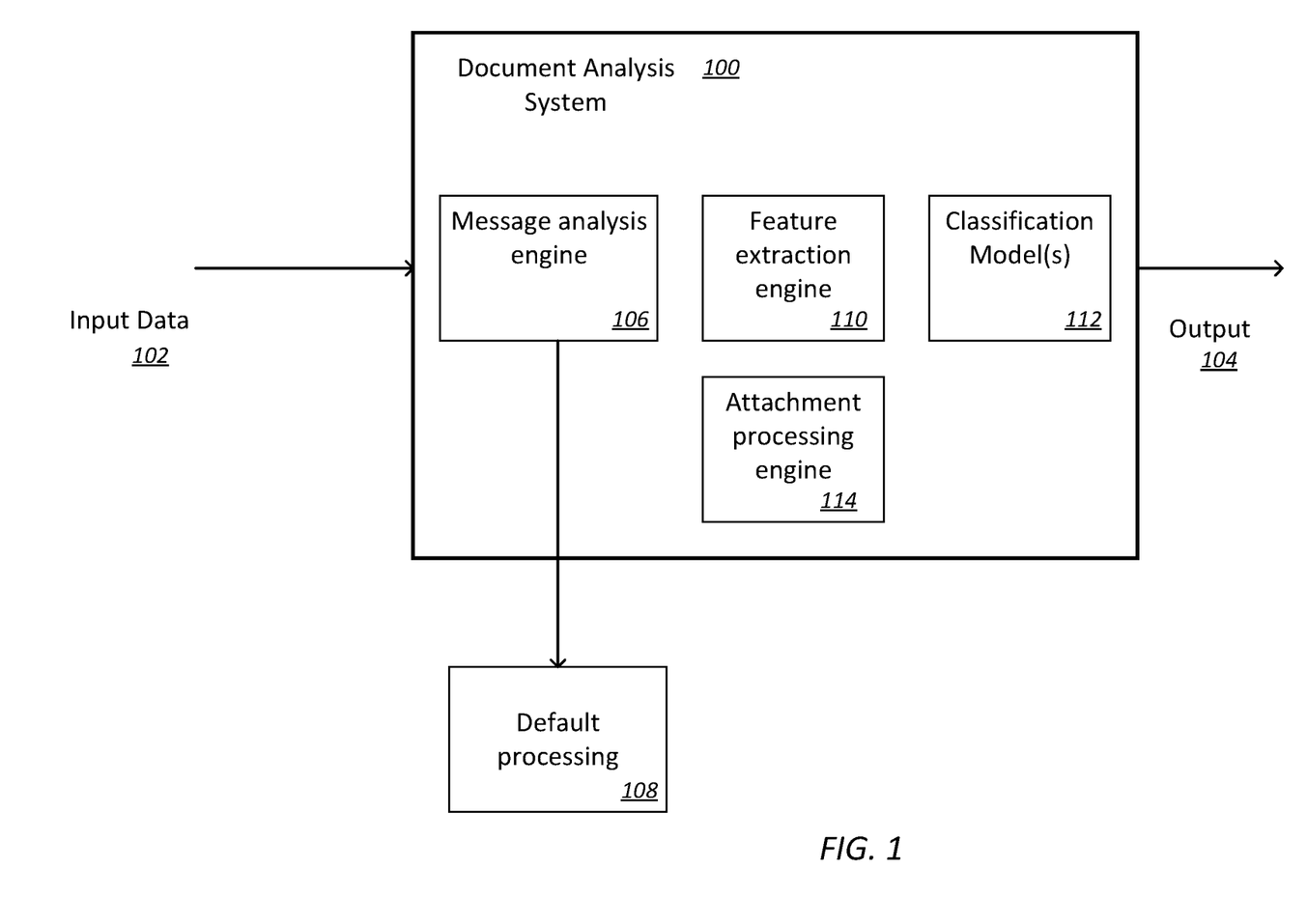
FIG. 1 is an example message analysis system.

This specification describes a machine learning approach to classifying attachments from received messages. FIG. 1 is an example message analysis system 100. The system 100 can be (or be a subsystem of) a title production system. In particular, in some instances, the document analysis system 100 is a system that analyzes input data 102 to generate one or more outputs 104.

The message analysis system 100 includes a message analysis engine 106, a feature extraction engine 110, an attachment processing engine 114, and one or more classification models 112.

The message analysis engine 106 receives an incoming message, e.g., as input data 102, and analyzes the message to determine, for example, whether the message includes an attachment or whether the attachments are of a type suitable for processing by the document analysis system. Messages that do not include attachments or that are not suitable can be sent to default processing 108. Default processing 108 can include routing the message to an inbox of one or more appropriate recipients.

Determining whether an attachment is of a suitable type can include determining a file type of the attachment. For example, Portable Document Format (PDF) files may be considered suitable as they are likely to be documents related to the title production system. Other file types, for example, image file types of small size may be indicative of company logos transmitted with email messages and not relevant content to the title production system.

In some implementations, the message analysis engine 106 can further process the incoming message to determine identifying information used to link the message to a particular file. For example, the subject line of the message may include a file number. This file number can be linked to data in the title production system including, for example, parties to a real estate transaction in process including lender entities and the geographic location of the parcel of real property, e.g., county and state. Similarly, the message analyzer can identify other information that can be used as features input to the one or more classification models including entity names (e.g., parties to a transaction or partner entities) and geographic indicators, e.g., references to a particular address associated with the message content such as an address for a subject parcel of real estate.

The attachment processing engine 114 can first process the document to recognize textual content if the text is not already available. For example, an optical character recognition process can be used to identify text from an image of text content, e.g., in a PDF without encoded text. The attachment processing engine 114 can then standardize the text and then extract vectors from n-grams in the standardized text. These vectors form features to be input to one or more classification models 112. The extracted vectors can correspond to particular n-grams.

In some implementations, natural language processing features can be augmented with features containing particular types of content. For example, one hot encoded features corresponding to geographic locations such as a city, state, or county can be separately extracted as vectors. A one-hot encoded vector can include a string of all zeros with the exception of a single "1" that is used to uniquely identify the particular feature content. For example, a vector can uniquely identify a particular geographic location based on the location of the single "1" value in the vector. One advantage of one hot encoding is that it can prevent a machine learning model from inferring importance based on vector values, e.g., that higher numbers are more important. Other one-hot encoded features can correspond to particular information associated with the transaction such as the names of the parties to a particular transaction or partner entities such as a mortgage lender. In some cases, the natural language processing can include a name recognition technique that identifies and separately extracts names. In some other instances, particular names are identified based on known file information, for example, as extracted from the message and cross-referenced with system data.

In some implementations, only a portion of the attachment document is processed. For example, a specified number of pages can be defined for processing, e.g., a first-k number of pages. The attachment features are extracted only from content of those pages of the document. This can speed up processing by limiting the size of an attachment portion used to make a classification decision.

Optionally, a feature extraction engine 110 can extract features from the content of the message as well as features obtained or derived from the file information identified by the message analysis engine 106. Extracting features from the content of the message can include examining the text in the subject of the message and/or the body of the message for particular words or phrases that provide some degree of match to specified terms or phrases, for example, a reference to the name of the document attached. These features can be part of the input to one or more of the classification models 112.

The classification models 112 receive features from the feature extraction engine 110 and the attachment processing engine 124 and generate a predicted classification or classifications of the attachment. In some implementations, the classification models 112 include a one or more statistical machine learning model and one or more rule-based models that can each be used under certain circumstances to generate a classification.

Training a Machine Learning Model

Figure 2:
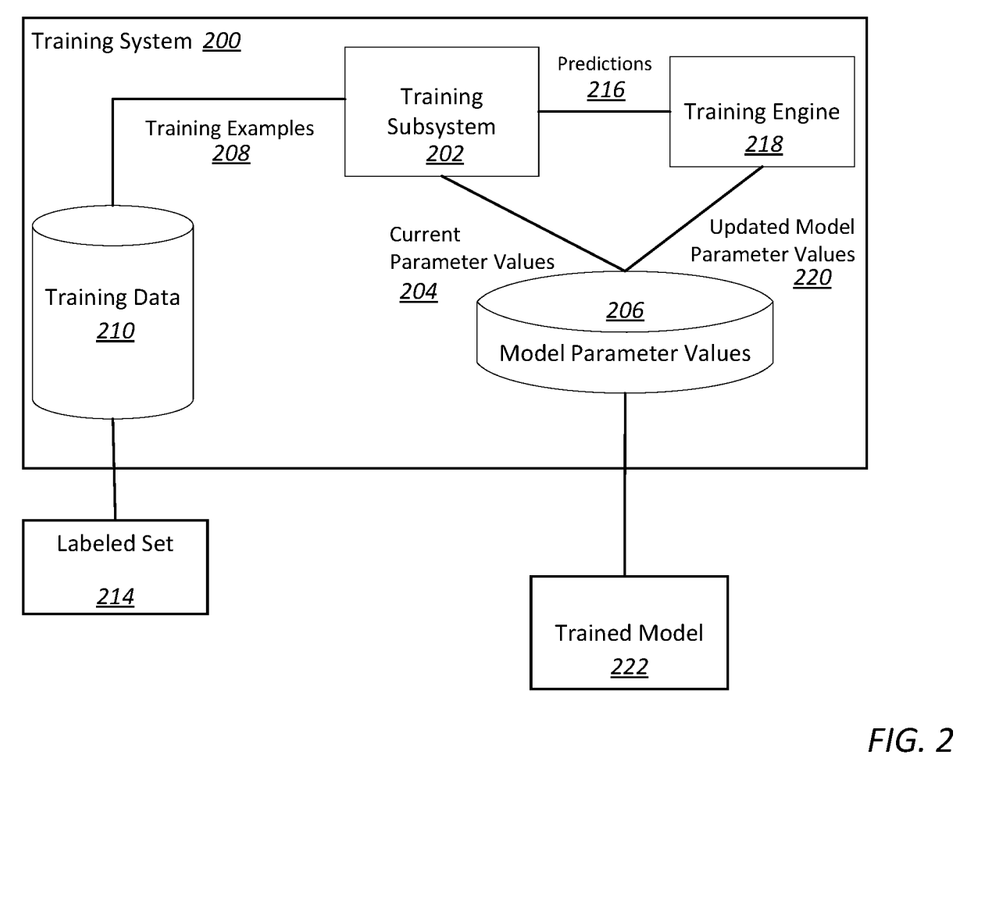
FIG. 2 is an example training system for a machine learning model.

FIG. 2 is an example training system 200 for a machine learning model. The training system 200 includes a training subsystem 202 that can implement the operations of a machine learning model designed to make predictions, for example, of a classification of a document from a set of possible classifications, from input data. The training subsystem 202 includes a plurality of computing devices having software or hardware modules that implement the respective operations machine learning model being trained.

The training subsystem 202 can compute the operations of the machine learning model using current parameter values 204 stored in a collection of model parameter values 206. Although illustrated as being logically separated, the model parameter values 206 and the software or hardware modules performing the operations may actually be located on the same computing device or on the same memory device.

The training subsystem 202 can receive training examples 208 as input from training data 210. Each training example 208 can be a message, e.g., an email message, having at least one attachment to be classified. The training subsystem can extract features from the training example and use those features, along with other features associated with the training example, to compute the operations of the machine learning model using the current parameter values. Examples of specific features used by the machine learning model both in training and in predicting a classification for a particular attachment document are described in greater detail below with respect to FIG. 3.

The training data 210 includes a collection of messages, each having one or more attachments. The messages and attachments can have various content and can be pulled, for example, from a collection of email messages associated with various aspects of a real estate transaction. Each of the attachments can be labeled with a type corresponding to a known classification of the type of attachment document. The training data 210 can be composed of a human-labeled set of messages 214. Additionally, in some implementations, each message in the training data includes associated features derived from other information, for example, features related to file data associated with the message e.g., a geographic location feature.

The training subsystem 202 can generate, for each training example 208, one or more predictions 216 of document classifications. A training engine 218 analyzes the classification predictions 216 and compares the predictions to the labels in the training examples 208. The training engine 218 then generates updated model parameter values 220 by using an appropriate updating technique. The training engine 216 can then update the collection of model parameter values 206 using the updated model parameter values 220.

After training is complete, the training system 200 can use the final set of model parameter values to form a trained model 222. The trained model can be used to make predictions classifying documents based on incoming feature data.

In some implementations, the training data is based on a set of messages associated with a real estate transaction and include labeled attachments corresponding to various forms exchanged as part of a title production system workflow. The system is trained so that, for a given set of input features derived from a particular message and its attachment, the machine learning model can generate predictions of one or more classifications of the attachment.

Message Processing

Figure 3:
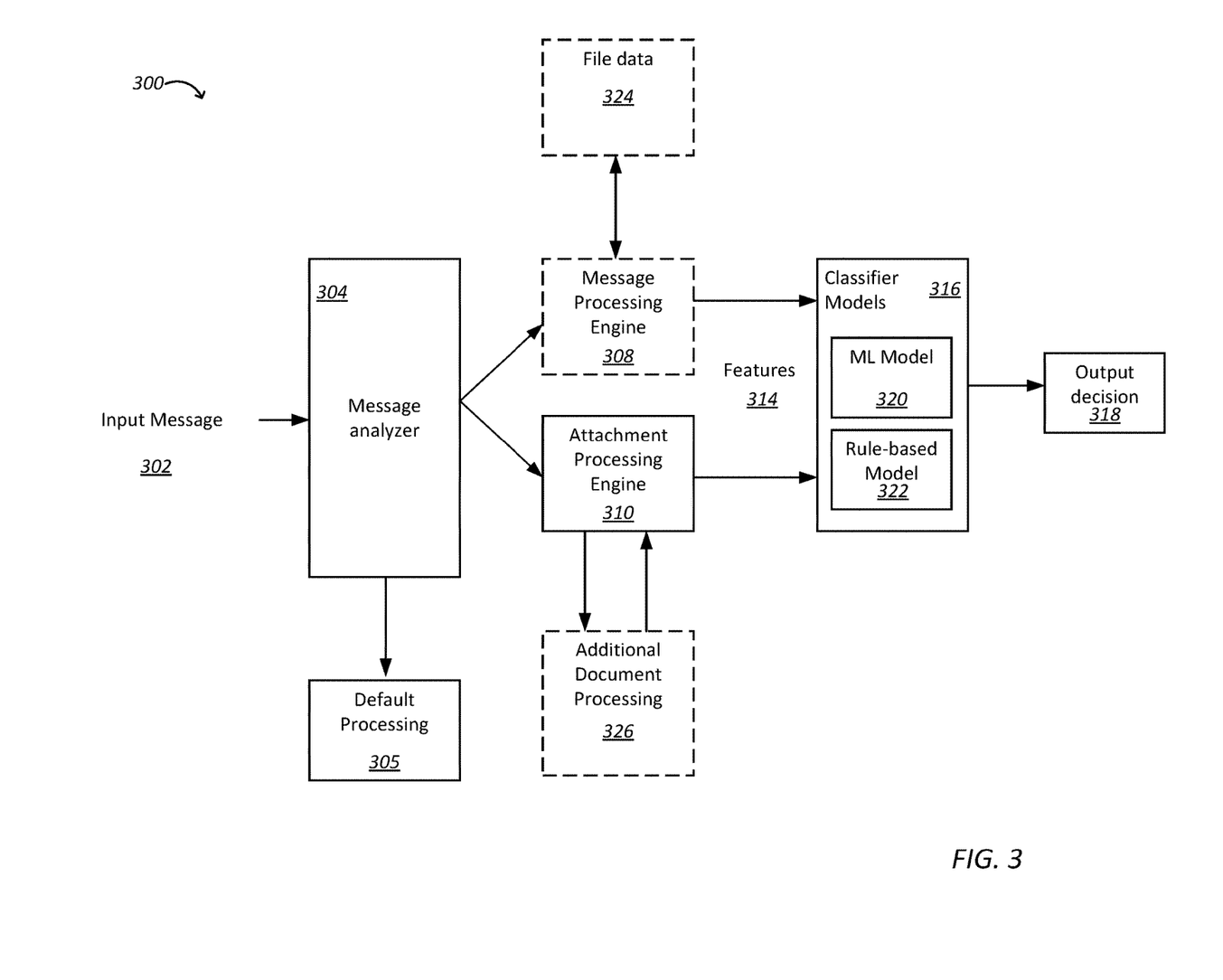
FIG. 3 is an example diagram illustrating a message processing path.

FIG. 3 is an example diagram 300 illustrating a processing path for classifying an attachment document, performed, for example, by a document analysis system.

An input message 302 is received by the system. For example, the input message can be a received email message. A message analyzer 304 analyzes the input message to determine whether the message is suitable for processing. The message analyzer 304 can determine whether the message includes an attachment. Messages that do not include attachments can proceed to default processing 305, which includes, for example, directly routing the message to the recipient inbox without further processing by the document analysis system.

Additionally, for messages having attachments, the system can determine whether the attachment is of a suitable type. For example, the file type of the attachment can be used to determine suitability. Portable Document Format (PDF) files may be considered suitable as they are likely to be documents related to the title production system. Other file types, for example, image file types of small size may be indicative of company logos transmitted with the messages and not likely to contain relevant content. In such cases, the message can be routed to default processing 305 in a similar manner to messages that do not include attachments.

In some implementations, the message may contain a suitable attachment, e.g., a PDF, as well as an unsuitable attachment, e.g., a logo image of the sender. In such cases, the unsuitable attachment can be discarded for purposes of the message processing and only the suitable attachment is classified.

In some implementations, the message analyzer 304 determines whether the message includes an identifier linking the message to a particular real estate transaction. If the message does not include an identifier, e.g., a file reference or transaction identifier, it can be considered unrelated to a real estate transaction and the message can be routed to default processing including, for example, sending the message to one or more recipient inboxes.

If the message includes a suitable attachment, the system performs attachment processing 310 and optionally performs message processing 308.

Attachment processing 310 is performed to extract features from the attachment document. In some implementations, the attachment included encoded text. However, in some other implementations, the attachment requires processing to return interpretable text. For example, the attachment can be a PDF document as an image without encoded text. The attachment can be routed to additional document processing 326. This additional processing can include performing a text recognition process to recognize the text content within the attachment document. Attachments may be of varying quality. For example, scanned documents may have artifacts and other errors that affect the text recognition process. This can result in a lower level of confidence in the accuracy of the text. In some implementations, the recognized text is associated with one or more confidence values. In such situations, the attachment processing 310 can continue, but may influence how the features are evaluated, as described in more detail below.

In some implementations one or more additional criteria are evaluated to determine whether the attachment document can be further processed. For example, the system can determine a character count of the document either before and/or after OCR'ing the document. If the character count satisfies a specified threshold, the document can be considered to be empty. In another example, the system can determine what percentage of words in the document have only 1 character or only 2 or fewer characters. If the percentage satisfies a specified threshold, the extracted text can be considered garbage text that should not be further processed.

The attachment processing 310 performs standardization of the document text. The standardization replaces specific names, places, and entities with a generic tag e.g., John Smith becomes [person]. Similarly, a particular monetary amount, e.g., a loan amount, can be standardized to [currency]. The standardization uses name recognition to identify names as well as a domain knowledge base. The domain knowledge base can identify a list of document types and colloquial aliases, e.g., "Deed of Trust" and "DoT." When terms of the domain knowledge base are identified in the document text they can be replaced with a corresponding generic tag. The standardization can also use one or more named entity recognition models. These name entity recognition models can be trained to predict the occurrence of different types of named entities based on interpretation of the position of a term in the document relative to other words, capitalization, etc.

The standardization is performed on the training documents for the machine learning models to prevent the models from learning biases based on unique naming scenarios. For example, if the training documents only have the name "john" in the example 1003 documents, the model might learn to make an association of "john" with that type of document that would not be accurate generally. Therefore, the model is trained using standardized examples to avoid training biases. Consequently, input features to the trained model should also be standardized.

Following standardization, the attachment processing 310 extracts features from the standardized text. In some implementations, n-grams, e.g., words or phrases extracted from the standardized text, are converted into vectors. Using n-grams rather than individual words allows for phrases that help identify the type of attachment be considered together. For example, the bigram "grant deed" can be a greater aid in classification than the individual words "grant" and "deed" in isolation.

The frequency of particular phrases can be captured as well so that the set of vectors indicate both unique n-grams and their frequency within the attachment document. For example, a "bag of words" approach can be used to calculate the term frequency of n-grams. For the document, a vector can be generated that identifies each n-gram and a count of occurrences for that n-gram. Typically, the order of the n-grams is not preserved, just the frequency information. In some instances, the data is normalized by the inverse of the document frequency to counteract the high frequency of common terms like "the". In some other implementations, Singular Value Decomposition (SVD) can be applied to reduce the feature space dimensionality. SVD can reduce high frequency vectors that are unlikely to contain unique information for classification. In some implementations, a truncated SVD is used.

The optional message processing 308 analyzes the message content to identify features 314 to input into the classifier models 316. The message processing can include scanning the text of the message subject and/or the message body for particular names of documents. For example, the message body may be, "here is the 1003 form for Johnson purchase," where "1003" is a mortgage application form. Fuzzy matching processes can be used to determine the document name based on a partial match. The system can define particular fuzzy matching rules and tolerances that allow for variation depending on the type of variation and a confidence that the variation is still a match. For example, the text can refer to a "deed" instead of a "vesting deed" but be considered a match based on the fuzzy matching rules. Any identified terms are output as feature 314. In some implementations, fuzzy matching is based on a mathematical measure of similarity or closeness between different words or phrases. For example, the system can apply a measure such as cosine similarity or Jaccard similarity to particular content. Based on the scores of these similarity measures, a determination can be made as to whether they are considered a match.

In some implementations, similar fuzzy matching rules can also be applied to the filename of the attachment, which may identify the type of document.

Message processing 308 can also include determining if the message subject or body includes an identifier, e.g., of a file, transaction, or client. If the message includes an identifier, the identifier can be used by the system to retrieve particular file information, e.g., from file data 324. The particular file information can include data used as features to be input to the machine learning model. For example, the file information can include a geographic location of the real estate transaction. Many documents have a layout or content specific to the particular county in which the parcel of real estate is located. Therefore, the county and state associated with the message can be a feature used by the machine learning model to determine a predicted classification of the attachment.

Additionally, the retrieved file information can include parties associated with the transaction. This can include one or more financial institutions, for example, providing loan funding for the real estate transaction.

In some implementations, the retrieved file information includes a file status, which can also be used as a feature. The file status can indicate the stage of the real estate transaction, which can provide an indication of what types of document attachments are expected at that stage. For example, if closing documents have been signed and the state corresponds to a recording stage, the expected documents would be different than the documents at the beginning stage of a real estate transaction. Therefore, a feature indicating a stage of the real estate transaction can be used by the machine learning model to determine a predicted classification.

The features 314 from the attachment processing, and optionally features from message processing including any features derived by the message analysis, e.g., from file information, are input to the classifier models 316. The classifier models 316 include a machine learning model 320 and a rule-based model 322.

Whether to process the features using both the machine learning model 320 and the rule-based model 322 can depend on the results of the attachment processing and/or optional message processing. For example, based on the attachment processing, some features may have lower confidence, for example, due to poor text recognition. In such a case, the rule-base model 322 may be used in addition to the machine learning model 320.

In another implementation, the machine learning model is triggered in response to particular rule outcomes from the rule-based model. For example, a rule may determine whether the extracted attachment text is unclean, unfit, or empty. If the rule outcome is yes, the attachment can be marked as belonging to an "unknown" prediction classification. However, if the rule outcome is "no" the result can be to call the machine learning model 320 to perform classification.

The machine learning model 320 scores possible classifications of the attachment based on the input features and the model parameters. The machine learning model can be trained as described above with respect to FIG. 2. In some implementations, a highest scoring classification is output as the predicted classification 318 of the attachment. The predicted classification can further include a corresponding likelihood determined for the classification. In some alternative implementations, a specified number of highest scoring classifications are output in ranked order according to the respective scores. For example, the top three candidate classifications can be output. Additionally, each of the top three candidate classifications can also include the corresponding likelihood, e.g., as a percentage likelihood that the attachment has that classification. In some implementations, the machine learning model is unable to determine a particular classification for the attachment, and instead outputs an "unknown" classification.

The rule-based model 320 can use a set of rules to evaluate the attachment (and optionally message) features. For example, the rule-based model can include specific rules that define the classification of the attachment when satisfied. Thus, even if some of the features are low confidence, particular known features can control. For example, the title of the document may have been recognized with a higher degree of confidence than other attachment text and the features include one or more derived from the title. Based on a particular feature or feature appearing in the title the classification can be output by the rule-based model. In another example, when message features are obtained, the features corresponding to the subject of the message may trigger a classification rule.

Based on the classifier models 316, the system determines an output decision 318. As described above, this can be one result of the machine learning model 316 or a set of top ranked candidate classifications. When both classifier models are used, the classifications can be compared. When they match, the common classification can be output by the system.

In some cases, the classification output by the machine learning model 316 and the rule-based model 320 conflict. In such cases, the system can default to classifying the document according to one of the model outputs. In particular, since the rule-based model 320 may be used when there are uncertainties about some of the features, the system can set the classification output by the rule-based model 320 as the predicted classification when the classifications conflict.

In some implementations, a fallback path is provided for use in certain circumstances. For example, the message analyzer 302 can determine whether to route the message for processing on the fallback path. The fallback path can be designed to process messages according to a different machine learning model trained on a smaller feature set. This can be used, for example, when the message analyzer determines that the message relates to a client or jurisdictions that the ML model 320 has not been trained for. These can result in features that can bias the classification result. The fallback path can be a mirror of the processing flow described above with the only difference being the features extracted and the features used in the machine learning model on the fallback path.

Using a Machine Learning Model to Classify Attachments

Figure 4:
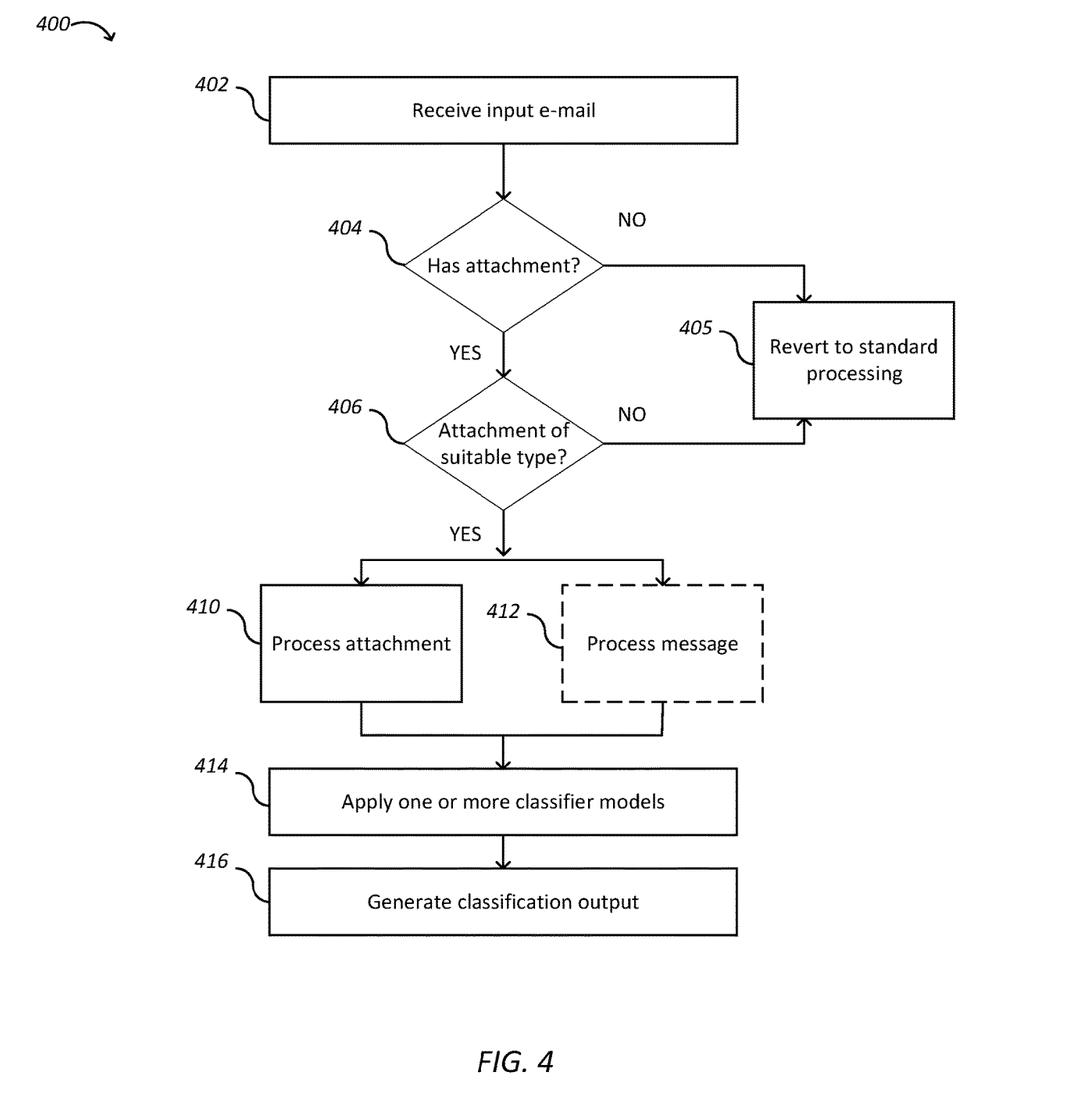
FIG. 4 is a flow diagram of an example method for classifying attachment documents.

FIG. 4 is a flow diagram of an example method 400 for classifying attachment documents. For convenience, the process 400 will be described as being performed by a system of one or more computers, located in one or more locations, and programmed appropriately in accordance with this specification. For example, the document analysis system 100 of FIG. 1, appropriately programmed, can perform at least part of the process 400.

The system receives an input message, e.g., an e-mail message (step 402). For example, the system can be configured to receive emails after they are received by a mail server. In some instances, the messages are processed to classify attachments before being routed to particular account mailboxes.

The system determines whether the message includes an attachment (step 404). Messages that do not include attachments (step 404, no branch) can proceed directly to the recipient inbox without further processing by the system (step 405).

In response to determining that the message does include an attachment (step 404, yes branch), the system determines whether the attachment is of a suitable type (step 406). As described above, files such as PDF files are more likely to represent information associated with a transaction than other files such as small JPEG files that are most likely sender logos or other images. If the system determines that the attachment is not of a suitable type, the message can proceed directly to the recipient inbox without further processing by the system (step 402).

In response to the system determining that the message includes an attachment of a suitable type (step 406, yes branch), the system processes the attachment of the message (step 410) and optionally processes the content of the message (step 412). In the example process 400, these steps are shown as conducted in parallel. However, in some other implementations these steps can be performed serially.

During attachment processing, the system generates features from vectors formed from n-grams identified in the content of the attachment document as described above with respect to FIG. 3. During message processing, the system extracts features based on the content of the message, also as described with respect to FIG. 3.

The system applies one or more classifier models to the features (step 414). In particular, the model can receive as input the features extracted from the message and the attachment (and optionally the message) can be input to a machine learning model that predicts one or more classifications of the attachment. Additionally, in some scenarios, features are also input into a second model, for example, a rule-based model to generate a classification of the attachment.

The system generates an output based on the model prediction (step 416). In some implementations, a highest scoring classification generated by the machine learning model indicating a most likely classification for the attachment is output. In some alternative implementations, the generated output includes a ranked list of highest scoring classifications. In yet other implementations where a rule-based model is used, the output of the rule-based model controls the output classification for the attachment.

In some implementations, the output is incorporated as a tag inserted into the message identifying the type of attachment. The message is then routed to one or more designated recipients including the attachment tag. In some other implementations, the recipient for the message is determined based on the determined attachment classification. In yet other implementations, the classification can trigger one or more workflow steps of a title production system and the attachment can be automatically routed as appropriate for executing the next workflow steps.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    receiving a message including an attachment document, wherein the message relates to a real estate transaction;
    determining that the attachment document has a document type corresponding to one or more particular document types;
    determining one or more first features from content of the attachment document;
    providing the first features to one or more classification models, the one or more classification models including a machine learning model, wherein the machine learning model is trained to generate a prediction of one or more classifications of attachment documents, each classification corresponding to a type of form associated with a real estate transaction, the generating the prediction being based on the one or more first features determined from the content of the attachment document and a plurality of model parameters trained based on a collection of messages, each having one or more labeled attachments corresponding to particular types of forms, wherein the collection of messages are associated with a plurality of real estate transactions;
    generating one or more predicted classifications of the attachment document; and
    associating the one or more predicted classifications with the attachment document.

2. The method of claim 1, wherein determining one or more first features from content of the attachment document comprises:
    standardizing text content of the attachment document; and
    generating the one or more first features from vectors computed from n-grams of the standardized text content.

3. The method of claim 2, wherein determining one or more first features further comprises performing text recognition on the attachment document, wherein the text recognition is associated with one or more confidence values.

4. The method of claim 3, wherein the one or more classification models includes a rule based model, wherein the rule based model applies one or more rules to the input features, and wherein the rule-based model is applied to the input features based on the one or more confidence values.

5. The method of claim 4, wherein in response to determining that a classification output by the machine learning model is different from a classification output by the rule-based model, the classification of the rule-based model is set as the predicted classification of the attachment document.

6. The method of claim 1, further comprising:
    determining one or more second features from content of the message, wherein determining one or more second features from content of the message comprises:
    generating one or more features based on text of the message matching predefined words or phrases, wherein the matching satisfies a specified degree of match between the text of the message and the predefined words or phrases.

7. The method of claim 6, wherein determining one or more second features from the content or the message comprises:
   determining the presence of a unique identifier in the content of the message corresponding to a unique file record; and
   generating one or more features based on the content of the file record.

8. One or more non-transitory computer-readable storage media encoded with instructions that, when executed by one or more computers, cause the one or more computers to perform operations comprising:
   receiving a message including an attachment document, wherein the message relates to a real estate transaction;
   determining that the attachment document has a document type corresponding to one or more particular document types;
   determining one or more first features from content of the attachment document;
   providing the first features to one or more classification models, the one or more classification models including a machine learning model, wherein the machine learning model is trained to generate a prediction of one or more classifications of attachment documents, each classification corresponding to a type of form associated with a real estate transaction, the generating the prediction being based on the one or more first features determined from the content of the attachment document and a plurality of model parameters trained based on a collection of messages, each having one or more labeled attachments corresponding to particular types of forms, wherein the collection of messages are associated with a plurality of real estate transactions;
   generating one or more predicted classifications of the attachment document; and
   associating the one or more predicted classifications with the attachment document.

9. The non-transitory computer-readable storage media of claim 8, wherein determining one or more first features from content of the attachment document comprises:
   standardizing text content of the attachment document; and
   generating the one or more first features from vectors computed from n-grams of the standardized text content.

10. The non-transitory computer-readable storage media of claim 9, wherein determining one or more first features further comprises performing text recognition on the attachment document, wherein the text recognition is associated with one or more confidence values.

11. The non-transitory computer-readable storage media of claim 10, wherein the one or more classification models includes a rule based model, wherein the rule based model applies one or more rules to the input features, and wherein the rule-based model is applied to the input features based on the one or more confidence values.

12. The non-transitory computer-readable storage media of claim 11, wherein in response to determining that a classification output by the machine learning model is different from a classification output by the rule-based model, the classification of the rule-based model is set as the predicted classification of the attachment document.

13. The non-transitory computer-readable storage media of claim 8, further comprising:
   determining one or more second features from content of the message, wherein determining one or more second features from content of the message comprises:
   generating one or more features based on text of the message matching predefined words or phrases, wherein the matching satisfies a specified degree of match between the text of the message and the predefined words or phrases.

14. The non-transitory computer-readable storage media of claim 13, wherein determining one or more second features from the content or the message comprises:
   determining the presence of a unique identifier in the content of the message corresponding to a unique file record; and
   generating one or more features based on the content of the file record.

15. A system comprising:
   one or more computers and one or more storage devices storing instructions that are operable, when executed by the one or more computers, to cause the one or more computers to perform operations comprising:
   receiving a message including an attachment document, wherein the message relates to a real estate transaction;
   determining that the attachment document has a document type corresponding to one or more particular document types;
   determining one or more first features from content of the attachment document;
   providing the first features to one or more classification models, the one or more classification models including a machine learning model, wherein the machine learning model is trained to generate a prediction of one or more classifications of attachment documents, each classification corresponding to a type of form associated with a real estate transaction, the generating the prediction being based on the one or more first features determined from the content of the attachment document and a plurality of model parameters trained based on a collection of messages, each having one or more labeled attachments corresponding to particular types of forms, wherein the collection of messages are associated with a plurality of real estate transactions;
   generating one or more predicted classifications of the attachment document; and
   associating the one or more predicted classifications with the attachment document.

16. The system of claim 15, wherein determining one or more first features from content of the attachment document comprises:
   standardizing text content of the attachment document; and
   generating the one or more first features from vectors computed from n-grams of the standardized text content.

17. The system of claim 16, wherein determining one or more first features further comprises performing text recognition on the attachment document, wherein the text recognition is associated with one or more confidence values.

18. The system of claim 17, wherein the one or more classification models includes a rule based model, wherein the rule based model applies one or more rules to the input features, and wherein the rule-based model is applied to the input features based on the one or more confidence values.

19. The system of claim 18, wherein in response to determining that a classification output by the machine learning model is different from a classification output by the rule-based model, the classification of the rule-based model is set as the predicted classification of the attachment document.

20. The system of claim 15, further comprising:
determining one or more second features from content of the message, wherein determining one or more second features from content of the message comprises:
generating one or more features based on text of the message matching predefined words or phrases, wherein the matching satisfies a specified degree of match between the text of the message and the predefined words or phrases.

21. The system of claim 20, wherein determining one or more second features from the content or the message comprises:
determining the presence of a unique identifier in the content of the message corresponding to a unique file record; and
generating one or more features based on the content of the file record.

* * * * *